United States Patent [19]

Harmatzy-Simon et al.

[11] Patent Number: 4,491,249

[45] Date of Patent: Jan. 1, 1985

[54] LIQUID FOOD DISPENSER

[76] Inventors: Bela Harmatzy-Simon, Nestorstrasse 11, D-1000 Berlin 31; Peter Schröder, Bergstrasse 96, D-5068 Odenthal-Glöbusch, both of Fed. Rep. of Germany; Peter A. Büchel, deceased, late of Köln, Fed. Rep. of Germany; by Helga Büchel née Diekmann, legal representative, Semmelweisstr. 159, D-5000 Köln 80, Fed. Rep. of Germany

[21] Appl. No.: 379,774

[22] Filed: May 19, 1982

[30] Foreign Application Priority Data

May 26, 1981 [DE] Fed. Rep. of Germany ....... 3120879

[51] Int. Cl.³ ............................................ G01F 11/10
[52] U.S. Cl. ................................... 222/325; 222/356; 222/564
[58] Field of Search ............... 222/325, 356, 357, 358, 222/564; 221/312

[56] References Cited

U.S. PATENT DOCUMENTS

| 1,080,196 | 12/1913 | Buerger | 222/358 |
| 1,295,508 | 2/1919 | Hughes | 222/358 |
| 1,634,374 | 7/1927 | McDonald | 222/357 X |
| 1,691,171 | 11/1928 | Twichell et al. | 222/358 X |

FOREIGN PATENT DOCUMENTS 203155  9/1923  United Kingdom ................ 222/358

Primary Examiner—H. Grant Skaggs
Assistant Examiner—Frederick R. Handren
Attorney, Agent, or Firm—Spensley Horn Jubas & Lubitz

[57] ABSTRACT

The liquid food dispenser comprises a housing (1) including a removable liquid food container (6). At a shaft (3) supported by the housing (1), a scoop arm (4) with a cup (5) and an external actuation lever (2) are provided and by swiveling the latter, the cup (5) is lifted out of the liquid food container (6) and tilted simultaneously thus evacuating its content into an inclined collecting channel (7) extending into an outlet (8). Upon lifting the cup (5) the solid components contained in the liquid food are uniformly distributed by being stirred in the liquid food container thus ensuring that the amount of solid components in the individual portions is equal.

8 Claims, 2 Drawing Figures

LIQUID FOOD DISPENSER

There is an ever increasing demand for strictly hygienically operating self-portioning devices for ingredients and food in view of the self-service facilities used for commercial food distribution such as in gastronomy, in company canteens as well as in schools and institutions.

The known devices for dispensing liquids are operated according to the piston pump principle or, as disclosed in U.S. Pat. No. 1,295,508, by means of a scoop system. However, only homogeneous food ingredients or liquids can be portioned this way such as e.g. mustard, ketchup, mayonnaise, cream, clear soup, cocoa, coffee, tea, syrup, gravies and dressings. While the amount of those and similar products can be provided in equal portions, it is not possible to obtain a uniform mixture of the substances and, as far as possible, a uniform distribution also of solid food components. Up to the present, attempts in this field were not successful to maintain a troublefree, continuous self-service.

It is the object of the invention to provide a system allowing to portion liquid food, in particular liquid food containing solid components (such as pieces of onion, persil, herbs, pepper corns, caraway and other granular spices as well as fruit, eggs, cheese, sausages, potatoes, vegetable, eat, dumplings, cut up small) by ensuring a uniform distribution of the solid components. It is imperative for such an operation that the pieces or solid components being always deposited at the bottom of the liquid or concentrated at its level are stirred up and uniformly distributed with each scooping. Anybody should be able to portion cold or hot liquid food in a hygienically acceptable manner.

The liquid food dispenser of the invention is characterized by the following features:

(a) within the housing there are mounted on a common shaft a scoop arm with a cup and an external actuation lever;

(b) the shaft and the pivot of the scoop arm are provided in the front upper third of the device;

(c) the length and shape of the scoop arm are so designed that, upon actuation of the lever, the respective displacement of the cup through the liquid food is as long as possible;

(d) in the upper position of the scoop arm, the content of the cup is evacuated into a collecting channel;

(e) the collecting channel is provided above the outlet through which the liquid food is dispensed to a plate situated below.

By the favorable arrangement of the constructional elements, it is possible to convey out of a closed container without any trouble an adjustable amount of a liquid scooped substance containing solid food components.

The common pivot of the actuation lever and the scoop arm is provided in the front upper third of the device. The scoop arm is bent off. It is as long as to allow a conveyer path as long as possible of the cup (approximately as long as the diagonal line of the liquid cross section) passing the liquid food. Only by this means, the solid food components will be stirred up and dosed uniformly.

Due to the particular design of the container, the depositing food components do not clog or fill up the basic starting position of the scoop and delicate solid food components will not be crushed.

The adjustable angular position of the scooping cup permits to vary the dosed amount, even considering the different flow properties of the scooped substance and its viscosity.

Due to the adjustable angular position of the discharge channel (or tube), the flow speed of the scooped substance can be adapted to the viscosity, liquid and size of the solid components.

The technical advance is based inter alia on the fact that the solution as found does not require any maintenance, and cleaning is easy and hygienically perfect.

An embodiment of the invention will be explained more closely hereinafter with reference to the drawings by way of an example.

Figure 1:
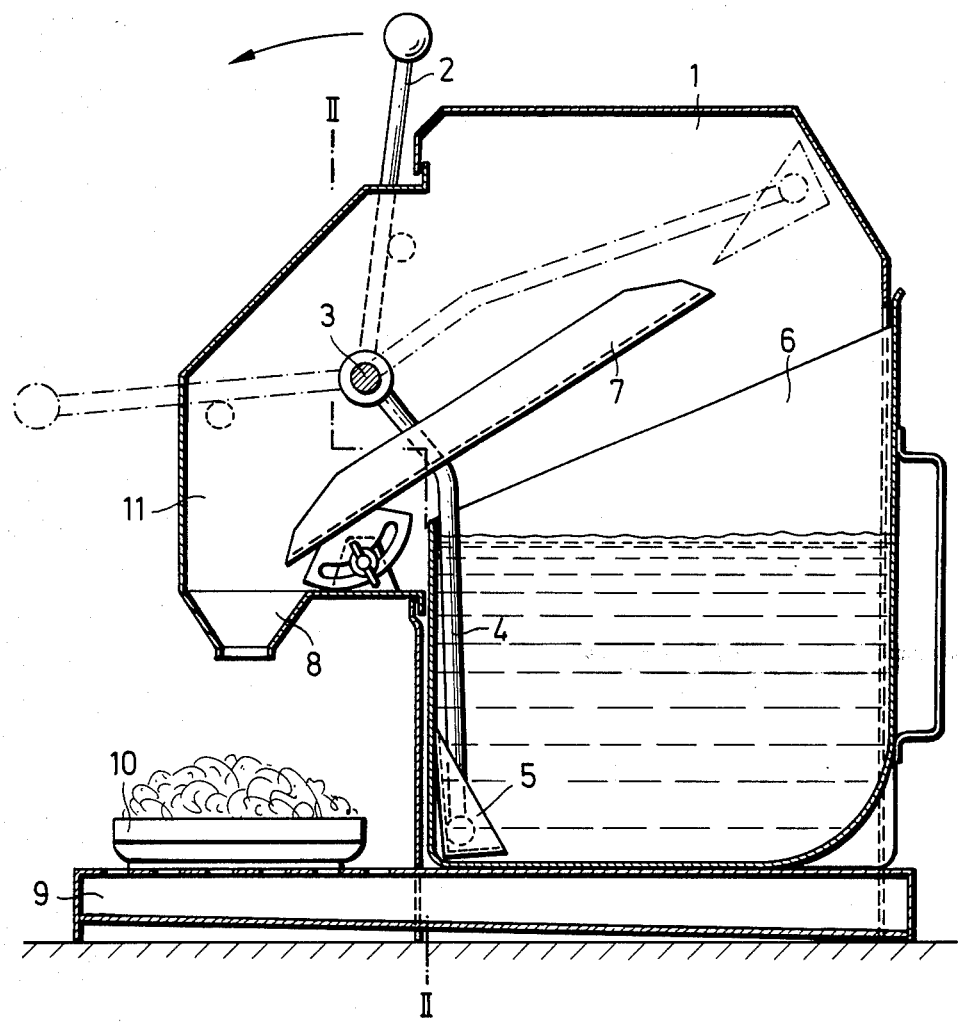
FIG. 1 is a schematic longitudinal section of the liquid food dispenser.
Figure 2:
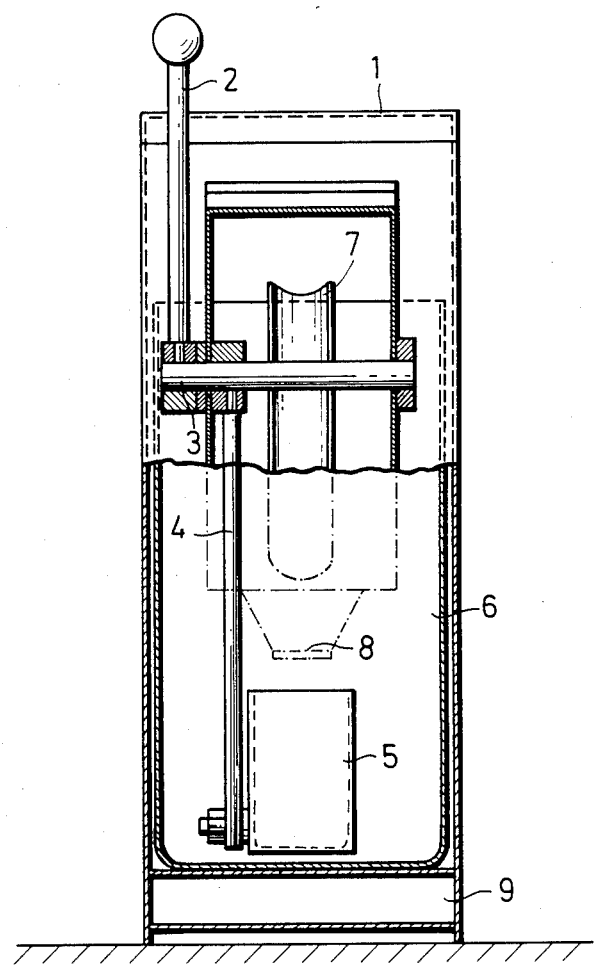
FIG. 2 is a section along line II—II of FIG. 1.

The apparatus consists of a housing 1 comprising a liquid food container 6 insertable from the rear. In an upright housing 1 a shaft 3 fitted in the upper third passes through the container wall at one side. At the external shaft end, an actuating lever 2 is mounted laterally. Inside the housing 1, a scooping arm 4 pivotable in upward and downward direction is firmly mounted eccentrically to vertically point downward in rest position. Shaft 3 is provided in a head portion of the housing projecting to the front and being removable for cleaning purposes. The scooping arm 4 is angular, and in rest position, its lower portion penetrates vertically into the container (6) inserted from the rear into the housing 1. At the lower end of the scooping arm 4, a cup 5 is fixed by central screwing. The angle position of the cup 5 can be varied by undoing the fixing screw. In the central plane of the cup or vessel, a collecting tube (or channel) 7 is adapted by screwing. Its opening is situated in the upper container region, however, below the highest position of the pivotable cup 5. In the lower region, the collecting tube 7 is screwed to the front container wall. By undoing the fixing screw, the angle position of the collecting tube 7 can be varied. The lower opening of the collecting tube 7 ends in an outlet 8. Its diameter is adjustable subject to the kind of meal or food. Below the outlet 8 and the housing 1 there is a plate socket 9 designed as a drip tray on which the plates 10 are placed vertically below the outlet 8.

The operation of the apparatus of the invention is as follows: The substance for scooping or the liquid food containing solid components is filled into the container 6 which is inserted into the housing 1. Upon the placing of the plates 10 on the drip tray 9, the actuation lever 2 is drawn in arrow direction. The scooping arm 4 mounted on the same shaft 3 and the cup of which, in rest position, is situated closely above the container bottom, moves upwardly while stirring the substance to be scooped. An adjustable amount of said substance as well as solid components thereof are taken away to be poured into the collecting channel 7 when the predetermined height is reached. As stated, in rest position, the cup is closely above the container bottom. When it is lifted to a nearly horizontal position, its distance to the container back wall is small temporarily. Thus, as intended, the displacement of the cup 5 through the liquid food is long.

The shape of the scooping cup 5 is that of a prismatic container the largest side of which is open, its side view corresponding to a right triangle. In rest position, the shortest leg of said triangle extends in parallel to the bottom, while the longer leg is parallel to the front wall of the liquid food container. The edged shape of the scooping cup favors its great flow resistance and causes a strong turbulence during its movement entailing a uniform distribution of the solid components in the liquid food. The substance to be scooped is flowing via the outlet 8 to the plate 10, the diameter of the outlet being always adapted to the respective product.

A most important application of the liquid food dispenser is self-scooping of dressings containing solid components (onions, grains and spices etc.). It is also possible to use the device for self-scooping of soups and gravies in large canteens under perfect hygienic conditions.

What is claimed is:

1. A liquid food dispenser for dispensing a defined amount of liquid food containing solid components comprising:
   a housing for holding the liquid food having an outlet through which the liquid food is dispensed and an angularly adjustable collecting channel for providing liquid food therein to said outlet; and
   a shaft in the front upper third of the housing on which is mounted a scoop arm having a cup within said housing, said cup being angularly adjustable with respect to the scoop arm, the scoop arm having an actuation lever external to said housing, the length and shape of the scoop arm being such that, upon actuation of the lever, the cup is displaced through the liquid food along a path as long as possible and, in the upper position of the scoop arm, liquid food in the cup being evacuated into said collecting channel.

2. A liquid food dispenser according to claim 1 wherein the cup is shaped as a triangle having edges.

3. A liquid food dispenser according to claim 1 wherein the housing includes a container for holding the liquid food, said container being removable through the rear of the housing.

4. A device for dispensing portions of liquid food containing solid components in which the portions dispensed have a uniform distribution of solid components, comprising:
   a housing having a container portion at the bottom thereof for holding liquid food therein;
   an opening in said housing through which portions of liquid food are dispensed;
   a tilted trough situated within said housing and having a lower end adjacent said opening and an upper end located at least partially above said container portion, the tilt of the trough being adjustable, said trough for transporting liquid food from said upper end to said opening;
   an arm, situated within and pivotally mounted to said housing, having a cup near one end thereof attached thereto, the angle of said cup relative to said arm being adjustable, said arm being pivotable so that said cup is displaceable from a position near the bottom of said container portion to a position in said housing above said container portion and adjacent said tilted trough, said cup being oriented on said arm so as to be at least partly filled with liquid food when moved upward through liquid food in said container portion, and to at least partly dump the liquid food from said cup into said upper end of said tilted trough when said cup is displaced to a position in said housing above said container portion; and
   means for pivoting said arm controllable from outside said housing.

5. A device as in claim 4 wherein said means for pivoting said arm comprises:
   a horizontal shaft rotatable on its axis and having a portion interior to said housing to which said arm is attached and a portion exterior to said housing; and
   a member rigidly attached to said exterior portion whereby said cup is displaced within said housing by moving said member so as to rotate said shaft and pivot said arm.

6. A dispenser as in claim 4 wherein the cross section of said cup in a plane perpendicular to the open end of said cup is triangular.

7. A dispenser as in claim 4 wherein said container portion is removable from said housing.

8. A device for dispensing portions of liquid food containing solid components in which the portions dispensed have a uniform distribution of solid components, comprising:
   a housing having a container portion at the bottom thereof for holding liquid food therein and a head portion located mostly above said container portion and protruding forwardly of it, said container portion removable from said housing through the rear of said housing opposite said head portion;
   an opening in said head portion forward of said container portion through which portions of liquid food are dispensed;
   an arm, situated within said housing and having a pivotal mounting to the head portion, said arm having a portion extendable nearly vertically into said container portion, said arm having a cup located near the end of said portion of said arm, said cup having essentially straight edges and being located near to the bottom of said container portion and adjacent the forward part of said container portion when said arm is extended nearly vertically into said container portion, said arm being pivotable so that said cup is displaceable from a position near the bottom of said container portion through said liquid food to a position in said housing above said container portion, said arm and container portion being configured so that said cup passes close to the rear portion of said container portion when said arm is pivoted to displace said cup from a position near the bottom of said container portion to a position in said housing above said container portion, said cup being oriented on said arm so as to be at least partially filled with liquid food and causing a turbulent action in said liquid food while being displaced therethrough so that liquid food scooped by said cup has a uniform distribution of solid components;
   a transporting trough situated within said housing and having a first end adjacent said opening and a second end over said container portion, said second end higher than said first end and adjacent said cup when said cup has been displaced to a position in said housing above said container portion, said cup being oriented on said arm so as to at least partly dump the liquid food from said cup into said second end of said transporting trough when said cup is displaced from a position near the bottom of said container portion to a position in said housing above said container portion; and
   means for pivoting said arm controllable from outside said housing.

* * * * *